(No Model.) 2 Sheets—Sheet 1.

C. WEHNER.
GAGE FOR SAWING MACHINES.

No. 462,419. Patented Nov. 3, 1891.

Witnesses: Emil Neuhart, Theo. L. Popp.

Ch. Wehner Inventor
By Wilhelm Bonner
Attorneys.

(No Model.) 2 Sheets—Sheet 2.
C. WEHNER.
GAGE FOR SAWING MACHINES.
No. 462,419. Patented Nov. 3, 1891.
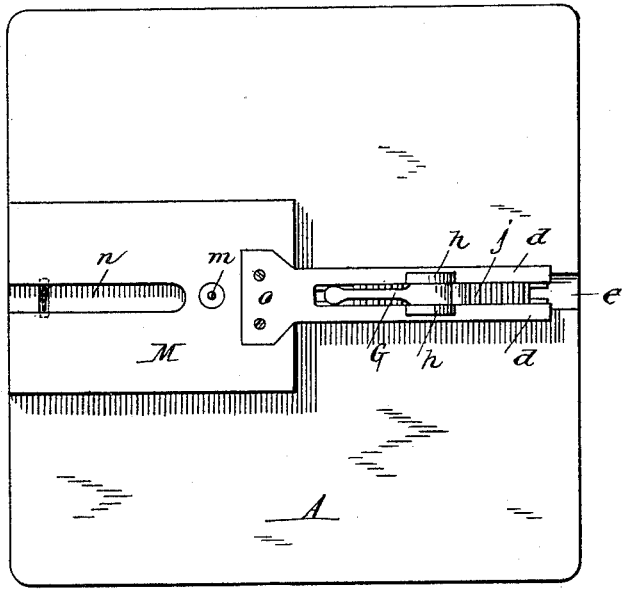
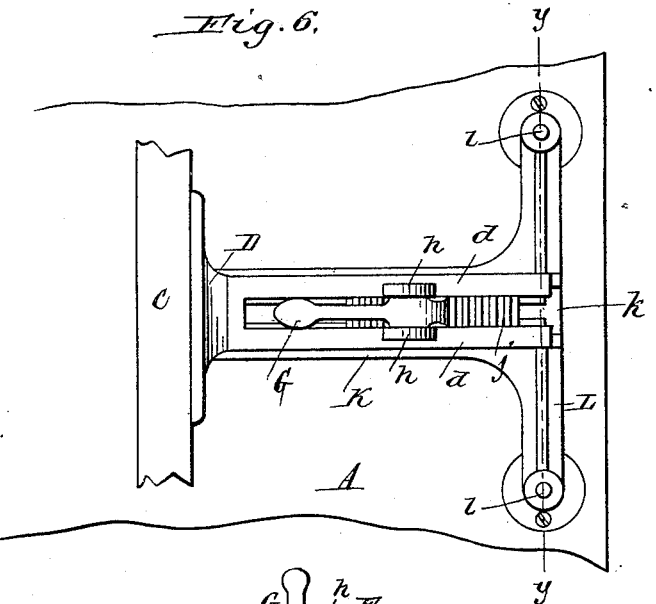
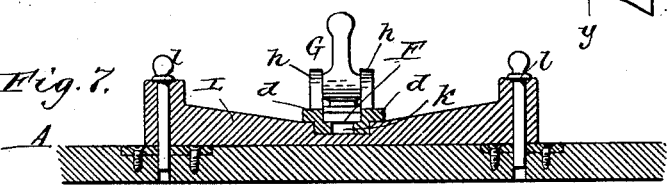
Witnesses:
Emil Neuhart.
Theo. L. Popp.
Ch. Wehner Inventor.
By Wilhelm Bonner
Attorneys.

UNITED STATES PATENT OFFICE.

CHRISTIAN WEHNER, OF BUFFALO, NEW YORK.

GAGE FOR SAWING-MACHINES.

SPECIFICATION forming part of Letters Patent No. 462,419, dated November 3, 1891.

Application filed May 9, 1891. Serial No. 392,186. (No model.)

*To all whom it may concern:*

Be it known that I, CHRISTIAN WEHNER, a citizen of the United States, residing at Buffalo, in the county of Erie and State of New York, have invented new and useful Improvements in Gages for Sawing-Machines, of which the following is a specification.

This invention relates to the adjustable gages which are employed on sawing-machines for gaging the width or thickness of boards or other material to be cut.

The object of my invention is to provide the gage with a clamping device of simple construction, which will permit the gage to be quickly and conveniently adjusted toward and from the saw.

Figure 1:
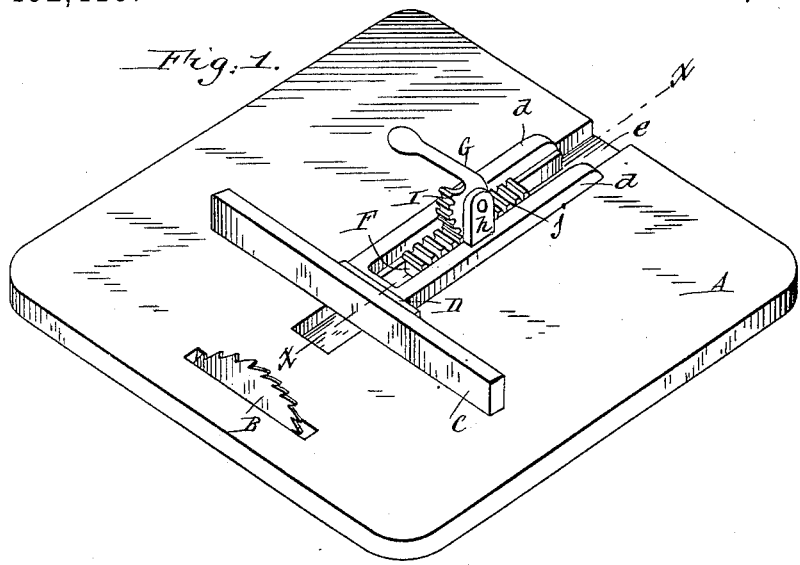
Figure 2:
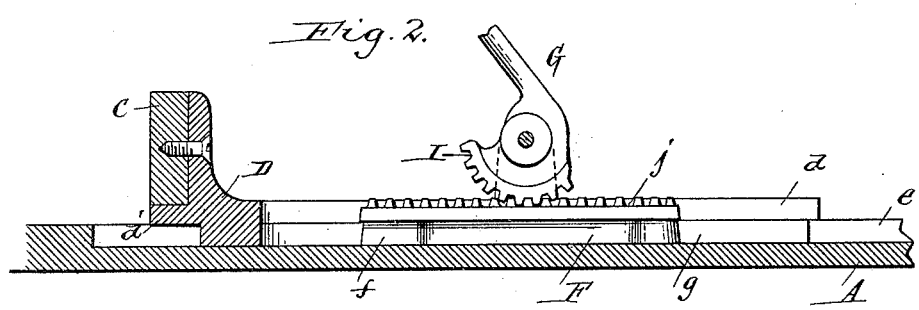
Figure 3:
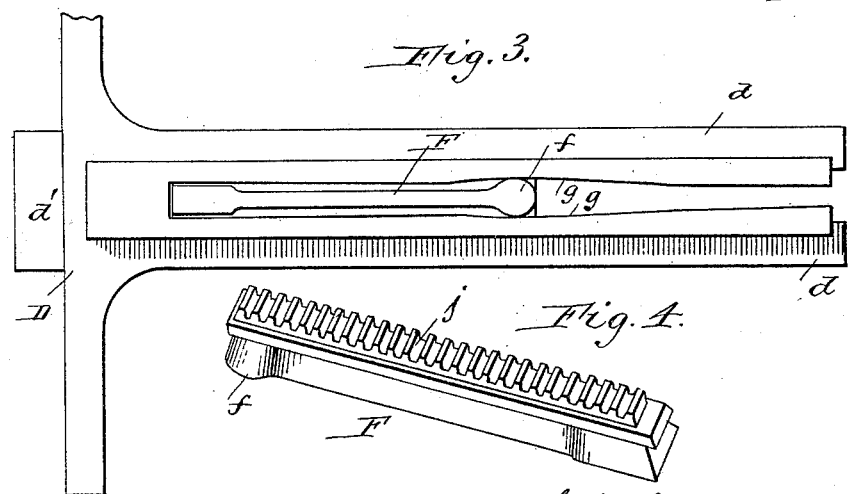
Figure 4:
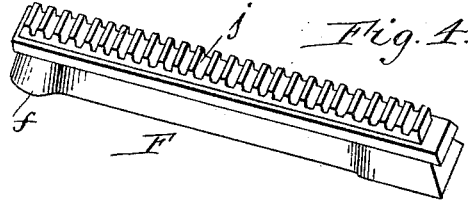

In the accompanying drawings, consisting of two sheets, Figure 1 is a perspective view of my improved gage applied to the table of a machine having a circular saw. Fig. 2 is an enlarged longitudinal section of the same in line $x$ $x$, Fig. 1. Fig. 3 is a bottom plan view of the gage removed from the table. Fig. 4 is a perspective view of the wedge whereby the gage is clamped in place. Fig. 5 is a top plan view showing my improved clamping mechanism applied to a gage designed to be used in connection with a band-saw for cutting boards into curved or segmental sections. Fig. 6 is a top plan view of a modified construction of the gage. Fig. 7 is a cross-section thereof in line $y$ $y$, Fig. 6, looking toward the left.

Like letters of reference refer to like parts in the several figures.

A represents the table of a sawing-machine, and B is the circular saw projecting through the usual slot in the table.

C is the gage-board, arranged parallel with the saw and made adjustable toward and from the saw. The gage-board is provided on its rear side with rearwardly-extending parallel arms or bars $d$ $d$, which are fitted in a transverse groove or way $e$, arranged in the table-top parallel with the arms $d$. The arms $d$ are connected at their front ends by an upright head or supporting-plate D, having on its front side a ledge $d'$, upon which the gage-board rests, the gage-board being secured to the supporting-plate D by screws, as shown.

F represents a wedge arranged lengthwise between the arms $d$ of the gage, and which is designed to spread the arms, so as to cause their outer faces to impinge against the sides of the groove $e$, and thereby clamp the gage in position. The arms, with their connecting plate or head, are constructed of metal, and the arms are sufficiently elastic to spring outwardly under the pressure of the wedge. The wedge preferably consists of a rectangular block having a head or enlargement $f$, which operates against inclined faces $g$, formed on the inner sides of the arms $d$. These inclined faces together form a converging space, into which the head $f$ enters and whereby the arms are spread apart.

G is a shifting-lever whereby the wedge F is operated to clamp or release the arms $d$ of the gage. This shifting-lever is pivoted between upright lugs or ears $h$, arranged on the arms $d$, and is provided at its inner end with a toothed segment I, which meshes with a rack-bar $j$, formed on the upper side of the wedge F. Upon depressing the shifting-lever the wedge is moved forwardly and caused to bind the arms $d$ against the sides of the groove, while upon raising the lever the wedge is retracted from the converging space formed by the inclines of the arms $d$, thereby releasing the latter and permitting the gage to be adjusted toward and from the saw. The gage is moved to the desired position by seizing the shifting-lever, and, after being adjusted, it is clamped in place by depressing the lever, the shifting-lever thus serving both as a handle for manipulating the gage and as a lever for locking the wedge. By this construction the gage is quickly shifted and clamped in place practically at one operation.

When the sawing-table is constructed of wood, the guide-groove $e$ is cut directly in the table-top, as represented in Figs. 1 and 2; but when the guide is used upon a metallic table a separate grooved supporting-plate is employed, as represented in Figs. 6 and 7.

K represents the supporting-plate having a longitudinal groove $k$ for receiving the arms $d$ of the gage and formed at its rear end with a cross-piece L, which is attached to the table-top in any suitable manner. In the construction represented in the drawings the cross-piece L is held against displacement upon the table by removable upright pins $l$ passing through perforated bosses formed at the ends of the cross-piece and openings in the table. In this modified construction the arms $d$ of the gage are clamped against the sides of the groove in the plate precisely as in the first-described construction.

In the modification illustrated in Fig. 5 my improved clamping device is shown in connection with a horizontal gage-board M, having an upright spur or center $m$, which penetrates the rear portion of the board to be sawed, so that the board may be swung upon said spur-center in the arc of a circle to cut the board into curved or segmental sections, the radius of the curve so cut being the distance between the spur-center and the band-saw. The gage-board M is provided with a longitudinal slot $n$, through which the band-saw passes. In this modified construction the arms $d$ are connected at their front ends by a horizontal plate or shank O, to which the horizontal gage-board is secured. The arms of the gage are clamped in the groove of the table by a wedge and locking-lever, as in the constructions previously described. Upon raising the lever to release the arms $d$ the gage-board may be adjusted to locate its spur-center closer to or farther away from the band-saw, and thereby cut a curve of greater or less radius.

I claim as my invention—

1. The combination, with the saw and the table having a guide groove or way, of an adjustable gage having an arm arranged in said groove, and a wedge whereby said arm is clamped in said groove, substantially as set forth.

2. The combination, with the saw and the table having a guide groove or way, of an adjustable gage having clamping-arms arranged in said groove and a wedge arranged between said arms, whereby the latter are clamped against the sides of the groove, substantially as set forth.

3. The combination, with the saw and the table having a guide groove or way, of an adjustable gage having clamping-arms arranged in said groove, a wedge arranged between said arms, whereby the latter are clamped against the sides of the groove, and a shifting-lever whereby said wedge is moved to clamp or release the clamping-arms of the gage, substantially as set forth.

4. The combination, with the saw and the table having a guide groove or way, of an adjustable gage having a clamping-arm arranged in said groove, a wedge bearing against said arm and provided with a rack-bar, and a shifting-lever having a toothed segment meshing with said rack-bar, substantially as set forth.

Witness my hand this 25th day of April, 1891.

CHRISTIAN WEHNER.

Witnesses:
JNO. J. BONNER,
C. F. GEYER.